United States Patent
Sermanet

(10) Patent No.: US 11,853,895 B2
(45) Date of Patent: *Dec. 26, 2023

(54) MIRROR LOSS NEURAL NETWORKS

(71) Applicant: Google LLC, Mountain View, CA (US)

(72) Inventor: Pierre Sermanet, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,454

(22) Filed: Aug. 23, 2022

(65) Prior Publication Data

US 2023/0020615 A1  Jan. 19, 2023

Related U.S. Application Data

(63) Continuation of application No. 16/468,987, filed as application No. PCT/US2018/023150 on Mar. 19, 2018, now Pat. No. 11,453,121.

(Continued)

(51) Int. Cl.
*G05B 19/04* (2006.01)
*G06N 3/084* (2023.01)
(Continued)

(52) U.S. Cl.
CPC ............. *G06N 3/084* (2013.01); *B25J 9/163* (2013.01); *B25J 9/1697* (2013.01);
(Continued)

(58) Field of Classification Search
CPC ........ G06N 3/084; G06N 3/045; G06N 3/008; B25J 9/163; B25J 9/1697; G05B 13/027;
(Continued)

(56) References Cited

U.S. PATENT DOCUMENTS

| | | | |
|---|---|---|---|
| 7,755,608 B2 * | 7/2010 | Chang | G06F 3/0425 345/157 |
| 2013/0290222 A1 * | 10/2013 | Gordo | G06F 18/2155 707/769 |
| 2016/0180151 A1 * | 6/2016 | Philbin | G06F 18/23 382/118 |

FOREIGN PATENT DOCUMENTS

CN    106056213 A    10/2016

OTHER PUBLICATIONS

Office Action in Chinese Appln. No. 20188006613.2, dated Nov. 29, 2022, 19 pages (with English Translation).

(Continued)

*Primary Examiner* — Harry Y Oh
(74) *Attorney, Agent, or Firm* — Fish & Richardson P.C.

(57) ABSTRACT

This description relates to a neural network that has multiple network parameters and is configured to receive an input observation characterizing a state of an environment and to process the input observation to generate a numeric embedding of the state of the environment. The neural network can be used to control a robotic agent. The network can be trained using a method comprising: obtaining a first observation captured by a first modality; obtaining a second observation that is co-occurring with the first observation and that is captured by a second, different modality; obtaining a third observation captured by the first modality that is not co-occurring with the first observation; determining a gradient of a triplet loss that uses the first observation, the second observation, and the third observation; and updating current values of the network parameters using the gradient of the triplet loss.

18 Claims, 4 Drawing Sheets

Related U.S. Application Data

(60) Provisional application No. 62/473,264, filed on Mar. 17, 2017.

(51) Int. Cl.

| | |
|---|---|
| *B25J 9/16* | (2006.01) |
| *G05B 13/02* | (2006.01) |
| *G06V 10/70* | (2022.01) |
| *G06V 10/82* | (2022.01) |
| *G06V 20/52* | (2022.01) |
| *H04N 7/18* | (2006.01) |

(52) U.S. Cl.
CPC ........... *G05B 13/027* (2013.01); *G06V 10/70* (2022.01); *G06V 10/82* (2022.01); *G06V 20/52* (2022.01); *H04N 7/181* (2013.01)

(58) Field of Classification Search
CPC ........ G06V 10/70; G06V 10/82; G06V 20/52; H04N 7/181; G06F 18/00
See application file for complete search history.

(56) References Cited

OTHER PUBLICATIONS

Abbeel et al., "Apprenticeship learning via inverse reinforcement learning," Proceedings of the 21st International Conference on Machine Learning, 2004, 8 pages.
Angizi et al., "DIMA: A Depthwise CNN In-Memory Accelerator," 2018 IEEE/ACM International Conference on Computer Aided Design (ICCAD), 2019, 8 pages.
Argall et al., "A survey of robot learning from demonstration," Robotics and Autonomous Systems, May 2009, 57(5):469-483.
Aytar et al., "SoundNet: Learning Sound Representations from Unlabeled Video," Advances in Neural Information Processing Systems, 2016, 9 pages.
Balntas et al, "Learning local feature descriptors with triplets and shallow convolutional neural networks," Procedings of the 2016 British Machine Vision Conference, Sep. 2016, 11 pages.
Boucenna et al., "Robots Learn to Recognize Individuals from Imitative Encounters with People and Avatars", Scientific Reports, Feb. 2016, 10 pages.
Caggiano et al., "View-Based Encoding of Actions in Mirror Neurons of Area F5 in Macaque Premotor Cortex," Current Biology, Jan. 2011, 21(2):144-148.
Calinon et al., "On Learning, Representing and Generalizing a Task in Humanoid Robot," IEEE Transactions on Systems, Man, and Cybernetics Part B, 2007, pp. 286-298.
Chebotar et al., "Combining Model-Based and Model-Free Updates for Trajectory-Centric Reinforcement Learning," arXiv, Jun. 18, 2017, 13 pages.
Chebotar et al., "Path Integral Guided Policy Search," arXiv, Oct. 11, 2018, 8 pages.
Cheng et al, "Person re-identification by multi-channel parts-based CNN with improved triplet loss function," Proceedings of the 2016 IEEE Conference on Computer Vision and Pattern Recognition, Jun. 2016, 10 pages.
Deng et al., "ImageNet: A Large-Scale Hierarchical Image Database," Presented at 2009 IEEE Conference on Computer Vision and Pattern Recognition, Miami, FL, USA, Aug. 18, 2009, 8 pages.
Doersch et al., "Unsupervised Visual Representation Learning by Context Prediction," IEEE International Conference on Computer Vision (ICCV), 2015, pp. 1422-1430.
Dragan et al., "Online Customization of Teleoperation Interfaces," The 21st IEEE International Symposium on Robot and Human Interactive Communication, Sep. 2012, pp. 919-924.
Duan et al., "One-Shot Imitation Learning," arXiv, 2017, 12 pages.
Dumoulin et al., "Adversarially Learned Inference," arXiv, Feb. 21, 2017, 18 pages.
EP Office Action in European Application No. 18,715,190.7, dated Oct. 13, 2021, 12 pages.
Fernando et al, "Self-supervised video representation learning with odd-one-out networks," arXiv, Nov. 2016, 10 pages.
Finn et al., "Learning Visual Feature Spaces for Robotic Manupulation with Deep Spatial Autoencoders," arXiv, 2015, 8 pages.
Goroshin et al., "Unsupervised learning of spatiotemporally coherent metrics," Proceedings of the 2015 IEEE Conference on Computer Vision, Dec. 2015, 8 pages.
Ijspeert et al., "Movement Imitation with Nonlinear Dynamical Systems in Humanoid Robots," Proceedings of the 2002 IEEE International Conference on Robotics and Automation, 2002, 2:1398-1403.
International Preliminary Report on Patentability in International Application No. PCT/US2018/023150, dated Sep. 17, 2019, 10 pages.
International Search Report and Written Opinion in International Application No. PCT/US2018/023150, dated Jul. 9, 2018, 17 pages.
Isola et al, "Learning visual groups from co-occurrences in space and time," arXiv, Nov. 2015, 11 pages.
Jayaraman et al, "Slow and steady feature analysis: higher order temporal coherence in video," Proceedings of the 2016 IEEE Conference on Computer Vision and Pattern Recognition, Jun. 2016, 10 pages.
Kingma et al., "Auto-encoding variational bayes," arXiv, May 1, 2014, 14 pages.
Kumar et al., "Learning Local Image Descriptors with Deep Siamese and Triplet Convolutional Networks by Minimizing Global Loss Functions," IEEE Conference on Computer Vision and Pattern Recognition (CVPR), 2016, pp. 5385-5394.
Levine et al., "Learning Neural Network Policies with Guided Policy Search under Unknown Dynamics," Advances in Neural Information Processing Systems, 2014, pp. 1071-1079.
Liu et al, "End-to-end comparative attention networks for person re-identification," arXiv, Jun. 2016, 10 pages.
Liu et al., "Imitation from Observation: Learning to Imitate Behaviors from Raw Video via Context Translation," arXiv, Jun. 18, 2018, 8 pages.
Markman, "Infants and Imitation," Psychology Today, Sep. 22, 2011, 6 pages.
Mathieu et al., "Deep Multi-Scale Video Prediction Beyond Mean Square Error", arXiv, Feb. 26, 2016, 14 pages.
Meltzhoff, "Infants Brains are Wired to Learn from Culture: Implications for Social Robots," Proceedings of the 1st Workshop on Modeling Interpersonal Synchrony and Influence, Nov. 2015, pp. 3-4.
Misra et al, "Shuffle and learn: Unsupervised learning suing temporal order verification," Lecture Notes in Computer Science, Sep. 2016, 18 pages.
Moo Yi et al., "LIFT: Learned Invariant Feature Transform,", arXiv, Jul. 29, 2016, 16 pages.
Mori et al., "Pose Embeddings: A Deep architecture for Learning to Match Human Poses," arXiv, Jul. 1, 2015, 9 pages.
Muelling et al., "Learning to Select and Generalize Striking Movements in Robot Table Tennis," AAAI Technical Report FS-12-07, Robots Learning Interactively from Human Teachers, 2012, 32(3):263-279.
Owens et al., "Visually Indicated Sounds," IEEE Conference on Computer Vision and Pattern Recognition (CVPR), 2016, pp. 2405-2413.
Pastor et al., "Learning and Generlization of Motor Skills by Learning from Demonstration," Proceedings of the 2009 IEEE International Conference on Robotics and Automation, 2009, pp. 763-768.
Pathak et al., "Learning Features by Watching Objects Move," Proceedings of the IEEE Conference on Computer Vision and Pattern Recognition (CVPR), 2017, pp. 2701-2710.
Paulin et al., "Local Convolutional features with unsupervised training for image retreival," Proceedings of the IEEE International Conference on Computer Vision, 2015, pp. 91-99.
Pomerleau, "Efficient training of artificial neural networks for autonomous navigation," Neural Computation, 1991, 3(1):88-97.

(56) References Cited

OTHER PUBLICATIONS pybullet.org [online], "Pybullet, a python module for physics simulation in robotics, games and machine learning," 2016-2017, retrived on Nov. 26, 2019, retrieved from URL<http://pybullet.org/>, 5 pages.
pypi.org [online], "Pybullet 2.5.8," Nov. 2019, retrieved on Nov. 21, 2019, retrieved from URL<https://pypi.org/project/pybullet/>, 5 pages.
Ratliff et al., "Imitation learning for locomotion and manipulation," Humanoids, 2007, pp. 392-397.
Ray et al., "Imitation in Infancy: The Wealth of the Stimulus," Developmental Science, Dec. 2010, 14(1):92-105.
Rivas, "Do Babies Really Learn Through Imitation? Brain Areas Associated with Movement Activate Upon Seeing Adults Move," Medical Daily, Oct. 30, 2013, 5 pages.
Rizzolatti et al., "The Mirror-Neuron System," Annual Review of Neuroscience, Jul. 2004, 27:169-192.
Ross et al., "A Reduction of Imitation Learning and Structured Prediction to No-Regret Online Learning," Proceedings of the Fourteenth International Conference on Artificial Intelligence and Statistics, 2011, 15:627-635.
Salakhutdinov et al., "Deep Boltzmann Machines," Artifical Intelligence and Statistics, 2009, pp. 448-455.
Schmidt et al, "Self-Supervised Visual Descriptor Learning for Dense Correspondence," IEEE, 2017, 8 pages.
Schroff et al., "FaceNet: A Unified Embedding for Face Recognition and Clustering," Proceedings of the IEEE Conference on Computer Vision and Pattern Recognition (CVPR), 2015, pp. 815-823.
Simo-Serra et al., "Discriminative Learning of Deep Convolutional Feature Point Descriptors," Proceedings of the IEEE International Conference on Computer Vision (ICCV), 2015, pp. 118-126.
Sohn, "Improved Deep Metric Learning with Multi-class N-pair Loss Objective," Advances in Neural Information Processing Systems, 2016, pp. 1857-1865.
Song et al., "Deep Metric Learning via Lifted Structured Feature Embedding," Proceedings of the IEEE Conference on Computer Vision and Pattern Recognition, 2016, pp. 4004-4012.
Stadie et al., "Third-Person Imitation Learning," arXiv, Mar. 6, 2017, 16 pages.
Stewart et al., "Label-free supervision of neural networks with physics and domain knowledge," Proceedings of the 31st AAAI Conference on Artificial Intelligence, 2017, pp. 2576-2582.
Szegedy et al., "Rethinking the Inception Architecture for Computer Vision," Proceedings of the IEEE Conference on Computer Vision and Pattern Recognition (CVPR), 2016, 2818-2826.
Tassa et al., "Synthesis and Stabilization of Complex Behaviors through Online Trajectory Optimization," International Conference on Intelligent Robots and Systems, 2012, pp. 4906-4913.
Theodorou et al., "A Generalized Path Integral Control Approach to Reinforcement Learning," Journal of Machine Learning Research, 2010, pp. 3137-3181.
Vincent et al., "Extracting and Composing Robust Features with Denoising Autoencoders," Proceedings of the 25th International Conference on Machine Learning, 2008, pp. 1096-1103.
Vision.imar.ro [online], "Human3.6M," Jul. 2014, retrieved on Nov. 12, 2019, retrieved from URL<http://vision.imar.ro/human3.6m/description.php>, 1 page.
Wang et al., "Unsupervised learning of cisual representations using videos," Proceedings of the 2015 IEEE Conference on Computer Vision, Dec. 2015, 9 pages.
Wei et al., "Dense Human Body Correspondences Using Convolutional Networks," IEEE Conference on Computer Vision and Pattern Recognition (CVPR), 2016, pp. 1544-1553.
Whitney et al., "Understanding Visual Concepts with Continuation Learning," arXiv, Feb. 22, 2016, 4 pages.
Wikipedia.com [online], "Imitation," Nov. 8, 2019, retrieved on Nov. 12, 2019, retrieved from URL<https://en.wikipedia.org/wiki/Imitation/>, 12 pages.
Wikipedia.com [online], "Mirroring (psychology)," Nov. 8, 2019, retrieved on Nov. 12, 2019, retrieved from URL<https://en.wikipedia.org/wiki/Mirroring_(psychology)/>, 5 pages.
Wise et al., "Fetch & Freight: Standard Platforms for Service Robot Applications," Workshop on Autonomous Mobile Service Robots, 2016, 6 pages.
Wiskott et al., "Slow Feature Analysis: Unsupervised Learning of Invariances," Neural Computation, 2002, 14(4):715-770.
Yi et al., "LIFT: Learned Invariant Feature Transform," European Conference on Computer Vision, 2016, pp. 467-483.
Zagoruyko et al., "Learning to Compare Image Patches via Convolutional Neural Networks," IEEE Conference on Computer Vision and Pattern Recognition (CVPR), 2015, pp. 4353-4361.
Zamir et al., "Generic 3D Representation via Pose Estimation and Matching," European Conference on Computer Vision, 2016, pp. 535-553.
Zhang et al., "Split-brain autoencoders: Unsupervised learning by cross channel prediction," Proceedings of the IEEE Conference on Computer Vision and Pattern Recognition (CVPR), 2017, pp. 1058-1067.

* cited by examiner

MIRROR LOSS NEURAL NETWORKS

CROSS-REFERENCE TO RELATED APPLICATIONS

This application is a continuation of U.S. patent application Ser. No. 16/468,987, filed on Jun. 12, 2019, which is a 371 of International Application No. PCT/US2018/023150 filed on Mar. 19, 2018, which claims priority to U.S. Provisional Application Ser. No. 62/473,264, filed on Mar. 17, 2017. The disclosures of the prior applications are considered part of and are incorporated by reference in the disclosure of this application.

BACKGROUND

This specification relates to training a neural network and the use of such network to perform tasks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that that trains a neural network and/or uses a trained neural network to cause an agent to perform a task or action.

In general, one innovative aspect of the subject matter described in this specification can be embodied in a computer-implemented method of training a neural network. The neural network has a plurality of network parameters and is configured to receive an input observation characterizing a state of an environment and to process the input observation to generate a numeric embedding of the state of the environment. The method includes: obtaining a first observation captured by a first modality; obtaining a second observation that is co-occurring with the first observation and that is captured by a second, different modality; obtaining a third observation captured by the first modality that is not co-occurring with the first observation; determining a gradient of a triplet loss that uses the first observation as an anchor example, the second observation as a positive example, and the third observation as a negative example; and updating current values of the network parameters using the gradient of the triplet loss.

The subject matter described in this specification can be implemented in particular embodiments so as to realize one or more of the following advantages. A neural network trained as described in this specification can generate numeric embeddings that differentiate similar observations captured by the same modality from one another. A neural network trained as described in this specification can generate numeric embeddings that are invariant to certain transformations, e.g., viewpoint, occlusions, motion-blur, lighting, background or object instances. Thus, the embeddings generated by the trained neural network can be employed to improve performance on a variety of tasks that require an accurate characterization of the state of an environment. Such tasks can be performed by, for example, robotic agents. Examples of these tasks include classifying stages of a pouring task, understanding temporal phases of manipulation tasks, and imitating human motion by a robotic agent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
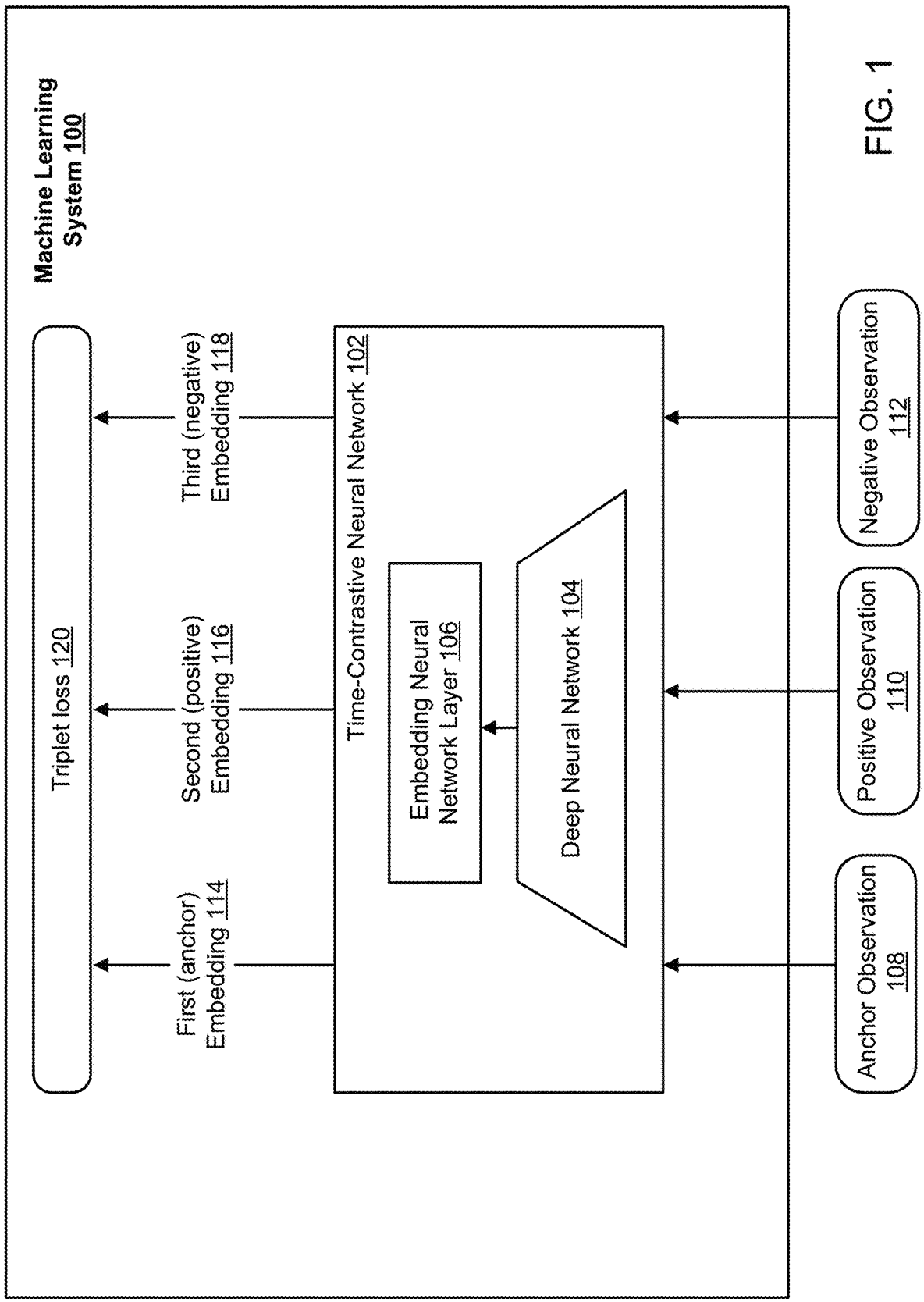
FIG. 1 shows an example machine learning system configured to train a time-contrastive neural network.

FIG. 1 shows an example machine learning system 100 that trains a time-contrastive neural network 102 using a gradient of a time-contrastive loss. The machine learning system 100 can be implemented as computer programs on one or more computers in one or more locations.

In particular, the time-contrastive neural network 102 is configured to receive an input observation characterizing a state of an environment and to process the input observation to generate a numeric embedding of the state of the environment. The numeric embedding is an ordered collection of numeric values, e.g., a vector of floating point values or of quantized floating point values. An observation characterizing the state of an environment can be an image of the environment, or a frame taken from a video of the environment. In some implementations, the observation can also include other kinds of data collected from the environment, e.g., tactile sensor data or audio data. In some cases, the environment may include an agent (e.g., a robotic agent or human) that is moving in the environment or is interacting with other objects in the environment to perform a specific task, e.g., robotic manipulation task, liquid pouring task, or robotic imitation task.

The numeric embeddings generated by the time-contrastive neural network 102 can be further processed, i.e., by the system 100 or an external system, in any of a variety of ways.

For example, the system 100 can further process numeric embeddings generated by the neural network 102 to generate control outputs that define actions to be performed by a robotic agent interacting with the environment. For example, to complete a robotic imitation task in which a robotic agent is trained to imitate behaviors/actions of a human or of another agent, the system 100 can include an additional component, e.g., a joints decoder neural network, that receives numeric embeddings generated by the time-contrastive neural network 102 as input and processes the number embeddings to generate control outputs that control the joints of the robotic agent. The system 100 can train the joints decoder neural network separately or concurrently with the training of the time-contrastive neural network 102 to generate control outputs that cause the robotic agent to imitate behaviors/actions of a human or of another agent, i.e., an agent that is depicted in the observations processed by the time-contrastive neural network 102.

As another example, an external system can compare two numeric embeddings to determine the similarity between the two states characterized by the embeddings, e.g., based on a distance between the two numeric embeddings in an embedding space.

As yet another example, a robotic agent can use the numeric embeddings to teach itself abstract dimensions and properties of the environment. For example, the robotic agent can receive multi-view or single-view observations of a human (or an agent) performing a liquid pouring task. The robotic agent can use numeric embeddings generated by the time-contrastive neural network 102 for the observations to disambiguate the abstract dimensions of the environment. For example, the robotic agent can learn that a cup can have different amounts of liquid, or the different poses a hand can be in. This self-taught understanding of the environment would enable the robotic agent to learn without requiring human supervision, therefore accelerating the learning of the robotic agent.

The numeric embeddings generated by the time-contrastive neural network 102 can be used in other computer vision use cases. For example, a robotic agent can capture multi-view (or single-view) videos of humans pouring liquid, observe these videos without labels, and then answer abstract questions about the scene (e.g., using language that is mapped to the numeric embeddings).

In general, one the neural network 102 has been trained, the system 100 can use the trained neural network 102 to process observations, can store the trained values of the network parameters for later use in instantiating a trained neural network, or provide the trained values of the parameters to another system for instantiating a trained neural network.

The time-contrastive neural network 102 includes a deep neural network 104 followed by an embedding neural network layer 106. The embedding neural network layer 106 is a fully connected neural network layer, e.g., a fully connected layer with 128 units.

In some implementations, the deep neural network 104 may include part of an Inception model followed by one or more convolutional neural network layers, a spatial softmax layer and a fully connected layer. The part of an Inception model included in the deep neural network 104 can be an Inception model up until the "Mixed_5d" layer, which is shown in the open-source code available at http://github.com/tensorflow/models/blob/master/research/slim/nets/inception_v3.py. An example of an Inception model is described in detail in C. Szegedy et al. "Rethinking the inception architecture for computer vision." CoRR, abs/1512.00567, 2015. For each feature dimension in an activation map received from previous layers (e.g. in a 109×109×32 activation map, the image is 109×109 and there are 32 feature dimensions), the spatial softmax layer is configured to output the spatial coordinates where the feature is maximally activated. An example of a spatial softmax layer is described in detail in C. Finn et al. "Learning visual feature spaces for robotic manipulation with deep spatial autoencoders." CoRR, abs/1509.06113, 2015.

In some cases, the system 100 can train neural network 102 from scratch. In some other cases, part of the neural network 102 can be pre-trained and used as a baseline for further training (e.g., the deep neural network 104 may have pre-trained weights from an Inception model).

As part of training the neural network 102, the machine learning system 100 obtains training input data including multiple triples of training observations. In some cases, the training observations include observations captured from multiple different viewpoints by multiple modalities. In other cases, the training observations include observations captured from a single viewpoint by a single modality. Generally, a modality specifies an input capturing device that captures observations (e.g., images, audios, or videos) characterizing states of an environment from a specific viewpoint. An input capturing device can be, for example, a camera, audio capturing device, video recorder, or tactile input capturing device.

Figure 2:
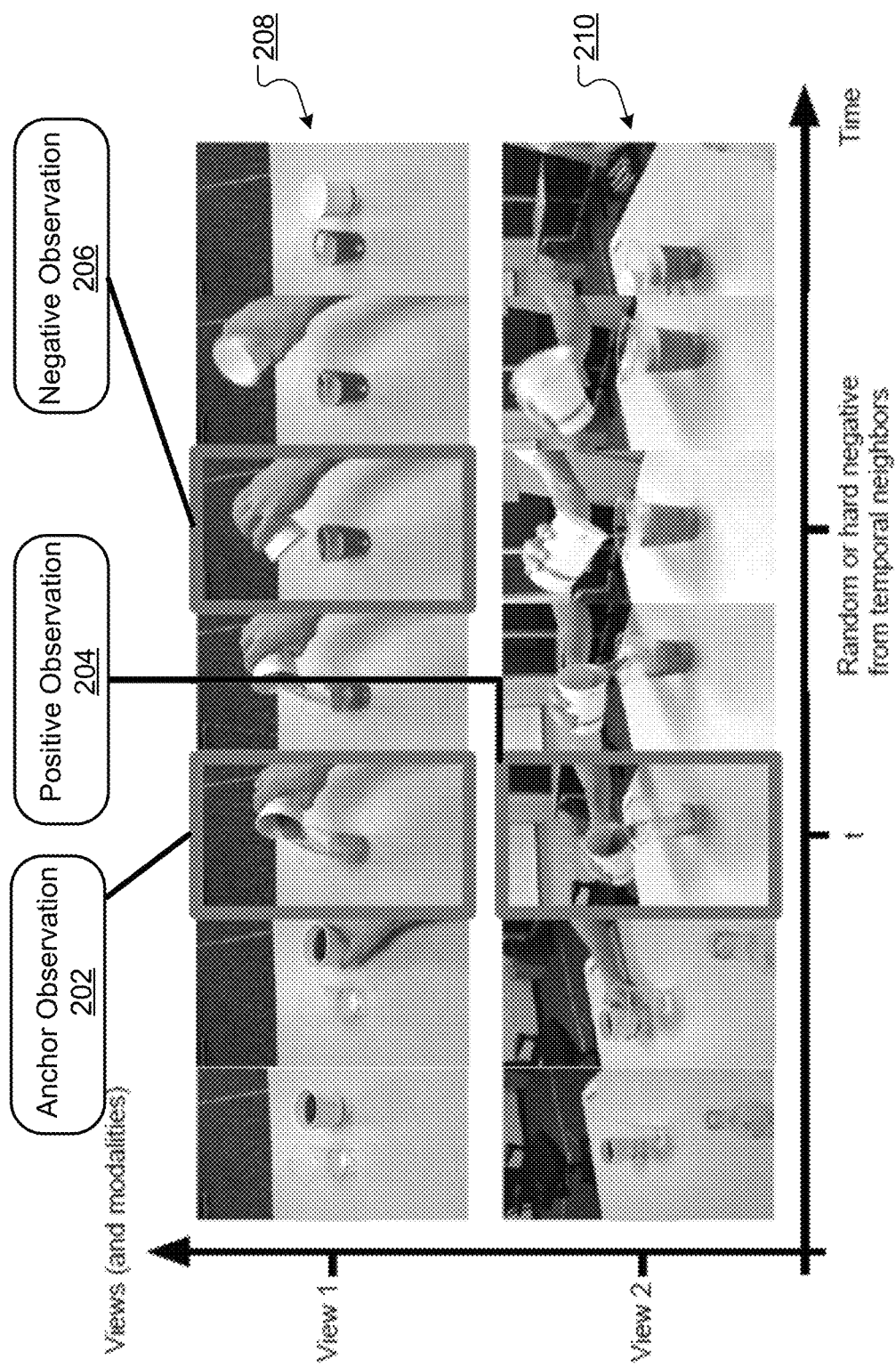
FIG. 2 shows an example triple of observations captured by two different modalities.

In particular, in some implementations (hereafter referred to as multi-view implementations), each triple of observations includes (i) an anchor observation 108 captured by a first modality, (ii) a positive observation 110 that is co-occurring with the anchor observation 108 and that is captured by a second, different modality, and (iii) a negative observation 112 captured by the first modality that is not co-occurring with the anchor observation. In some cases, the observations are images, with the first modality being a camera at a first viewpoint and the second modality being a camera at a second, different viewpoint. In general, however, the first and second modalities can be two different modalities of the same or of different types, e.g., cameras, audio capturing devices, tactile input capturing devices, and so on. An example of anchor, positive, and negative observations captured by two modalities at two different viewpoints is illustrated in FIG. 2.

In some implementations, the pair of first and second modalities are the same for all of the triples of observations included in the training input data.

In some implementations, some triples of observations in the training input data can be captured by the pair of first and second modalities, while some other triples of observations in the training input data are captured by a different pair of first and second modalities. That is, in the example where the modalities are cameras at various locations, the relative locations of the cameras that captured the positive and negative observations can vary across different triples.

Figure 3:
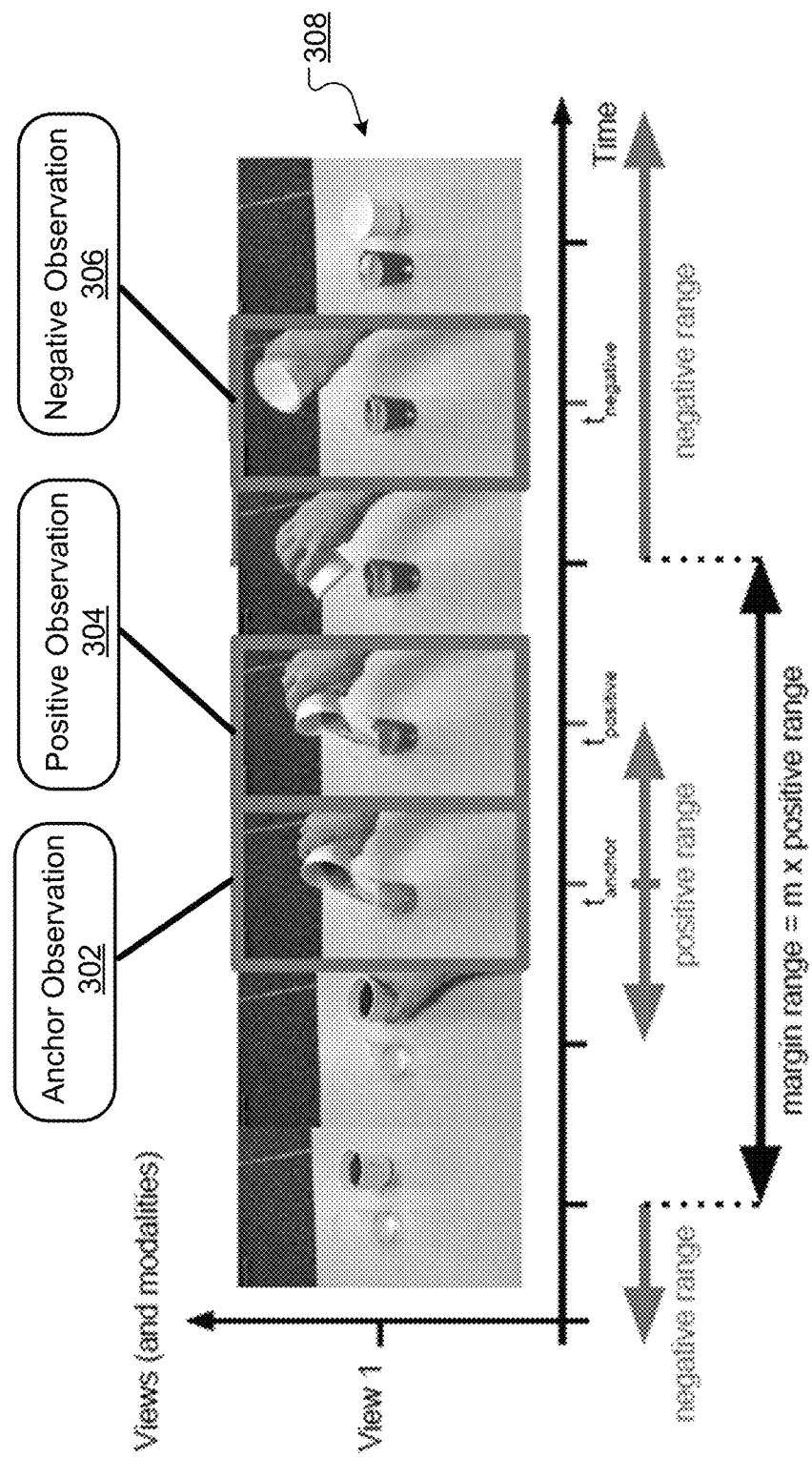
FIG. 3 shows another example triple of observations including an anchor observation, a positive observation, and a negative observation captured by a single modality.

In some other implementations (hereafter referred to as single-view implementations), each triple of observations includes (i) an anchor observation 108 captured by the modality, (ii) a positive observation 110 captured by the modality and being within a margin temporal neighborhood (or margin range) of the anchor observation 108, and (iii) a negative observation 112 captured by the modality and being outside of the margin temporal neighborhood of the first observation, i.e., the negative observation 112 is within a negative range of the first observation. The margin range of the anchor observation 108 defines a predetermined time window around the anchor observation 108. For example, assuming the anchor observation 108 is captured at the timestep t, the margin range of the anchor observation 108 includes observations that are captured from time step t−n to time step t+n, where n is a predetermined number of time steps. n can be a small number of time steps such as one, two, five, or ten seconds. An example of anchor, positive, and negative observations captured by a single modality at a single viewpoint is illustrated in FIG. 3.

The machine learning system 100 trains the neural network 102 on the triples in the training input data to determine trained values of the parameters of the neural network 102 from initial values of the parameters by minimizing a triplet loss. The triplet loss depends on, for a given triple of observations, the distance between the embedding of the positive observation and the negative observation and the distance between the embedding of the positive observation and the anchor observation. In particular, in some implementations the system 100 trains the neural network 102 to minimize the following loss function:

$$L=\Sigma_i^N[\|f(x_i^a)-f(x_i^p)\|_2^2-\|f(x_i^a)-f(x_i^n)\|_2^2+\alpha]_+,$$

where $f(\ )$ represents the time-contrastive neural network 102, i.e., $f(x)$ is an embedding generated by the time-contrastive neural network 102 for a given observation x. The time-contrastive neural network 102 may embeds an observation x into an embedding space such as a d-dimensional Euclidean space. $x_i^a$ is the anchor observation 108, $x_i^p$ is the positive observation 110, and $x_i^n$ is the negative observation. N is the number of triples of observations in the training input data. α is a constant value that defines the desired margin between the two distance in the loss function.

The triplet loss will also be referred to in this specification as a mirror loss or a time-contrastive loss.

In particular, for a given triple including anchor, positive, and negative observations, the machine learning system 100 determines a gradient of the triplet loss and then uses the gradient to update the values of the parameters of the neural network 102.

Specifically, the system 100 processes the anchor observation 108 using the time-contrastive neural network 102 in accordance with the current values of the network parameters to generate a first embedding 114. The system 100 processes the positive observation 110 using the neural network 102 in accordance with the current values of the network parameters to generate a second embedding 116. The system 100 processes the negative observation 112 using the neural network 102 in accordance with the current values of the network parameters to generate a third embedding 118.

The system 100 then determines the triplet loss 120 from (i) a first distance between the first embedding 114 and the second embedding 116 and (ii) a second distance between the first embedding 114 and the third embedding 118.

The system 100 can adjust the current values of the network parameters using conventional neural network training technique, e.g., a gradient descent-based training technique. For example, the system backpropagates the gradient of the objective function to determine a respective updated value for each of the network parameters of the neural network 102.

By updating the values of the network parameters to minimize the triplet loss, the system 100 ensures that the trained neural network 102 can generate numeric embeddings that are invariant to certain transformations, e.g., viewpoint, occlusions, motion-blur, lighting, background or object instances. Thus, the embeddings generated by the trained neural network 102 can be employed to improve performance on a variety of tasks that require an accurate characterization of the state of an environment. Examples of these tasks include classifying stages of a pouring task, understanding temporal phases of manipulation tasks, and imitating human motion by a robotic agent.

In some implementations, when the first modality is a camera that captures first person observations or third party observations of an agent (e.g., a robotic agent or a human) interacting with the environment, the system 100 can further train the time-contrastive neural network 102 to generate control outputs that position joints of the robotic agent in a same position as in received captured first person or third party observations. In particular, the time-contrastive neural network 102 may include an additional component, e.g., a joints decoder neural network, that is configured to receive as input the numeric embeddings observations generated by the time-contrastive neural network 102 for the observations, and to process the number embeddings to generate control outputs that control the joints of the robotic agent. The system 100 can train the joints decoder neural network separately or concurrently with the training of the time-contrastive neural network 102 to generate control outputs that cause the robotic agent to imitate behaviors/actions of the agent that is depicted in the observations processed by the time-contrastive neural network 102.

Once trained, the time-contrastive neural network 102 can receive input observations characterizing states of an environment and to process the input observations to generate numeric embeddings of the state of the environment FIG. 2 shows an example triple of observations including an anchor observation 202, a positive observation 204, and a negative observation 206 that are used to train the time-contrastive neural network 102 of FIG. 1. The observations 202-206 are images captured by two different modalities.

In this example, a first camera captures a sequence of images 208 of a hand (of an agent) pouring liquid into a cup from the first viewpoint. The agent can be a human or a robotic agent. The first viewpoint (view 1) can be a first person view, i.e., a view captured by a camera of the first agent that is pouring the liquid into the cup would see. Simultaneously, a second camera captures a sequence of image 210 of the same hand from a second viewpoint. The second viewpoint (view 2) can be a third party view, i.e., a view that a second agent, who is observing the first agent pouring the liquid into the cup, would see.

A first image is selected from the sequence of image 208 as an anchor image 202. The anchor image 202 can be randomly selected from the sequence of image 208. A second image that was taken at the same time as the anchor image 202 but by the second camera is selected from the sequence of image 210 as a positive image 204. A third image is selected from the sequence of images 208 as a negative image 206.

In some cases, the negative image 206 can be selected randomly from the sequence of images 208 captured by the first camera that are within a temporal neighborhood of the anchor image 202, e.g., images that are taken two, five, or ten seconds after the anchor image 202 was taken.

In some other cases, a hard negative or semi-hard negative relative to the anchor image 202 in the sequence of image 208 captured by the first camera can be selected as the negative image 206. In particular, to select an image that is a hard negative, a system can generate a current embedding for each image in the sequence 208 by running the sequence of images 208 through a time-contrastive neural network (e.g., the time-contrastive neural network 102 of FIG. 1). The hard negative image is the image that has a current embedding that is farthest away from the embedding of the anchor image 202. The semi-hard negative images are the ones that are not too close, i.e., images that have current embeddings that are farther from the embedding of the anchor image 202 than a threshold distance.

As shown in FIG. 2, the anchor image 202 is captured at time step t, and the negative image 206 is captured at time step t+2, which is within a temporal neighborhood of the anchor image 202. The negative image 206 is in the same sequence 208 as the anchor image 202. Being trained on the triple of anchor image 202, positive image 204, and negative image 206, the time-contrastive neural network 102 can learn to capture properties that vary over time but are consistent across views, such as hand poses and amounts of poured liquid, while becoming invariant to irrelevant transformations such as background or lighting.

FIG. 3 shows another example triple of observations including an anchor observation 302, a positive observation 304, and a negative observation 306 captured by a single modality.

In this example, a single camera captures a sequence of image 308 of a hand pouring liquid into a target container from a single viewpoint (view 1, which is a self-view). An image from the sequence 308 is selected as the anchor image 302. A positive image 304 is selected from images that are within a margin range around the anchor image 302. The positive image 304 can be randomly selected within the margin range. The margin range of the anchor image 302 defines a predetermined time window around the anchor image 302. For example, as shown in FIG. 3, the anchor image 302 is captured at the time step $t_{anchor}$, and the margin range of the anchor image 302 includes images that are captured from time step $t_{anchor}-2$ to time step $t_{anchor}+2$.

A negative image 306 is selected from images that are within a negative range of the anchor image 302, i.e., a range that is outside of the margin range of the anchor image 302.

The triple of images 302, 304 and 306 can be used as training input data to train the time-contrastive neural network 102 using the techniques described in detail above with reference to FIG. 1. By training the time-contrastive neural network 102 using images selected in this manner, the system 100 ensures that the neural network 102 can learn attributes in each observation and properties of an interaction. In the example of FIG. 3, the neural network 102 can learn to distinguish different poses of the hand, e.g., whether or not the hand is contacting the white cup. The neural network 102 can also learn the tilt of the white cup, or the amount of liquid currently in the target container or its viscosity.

Figure 4:
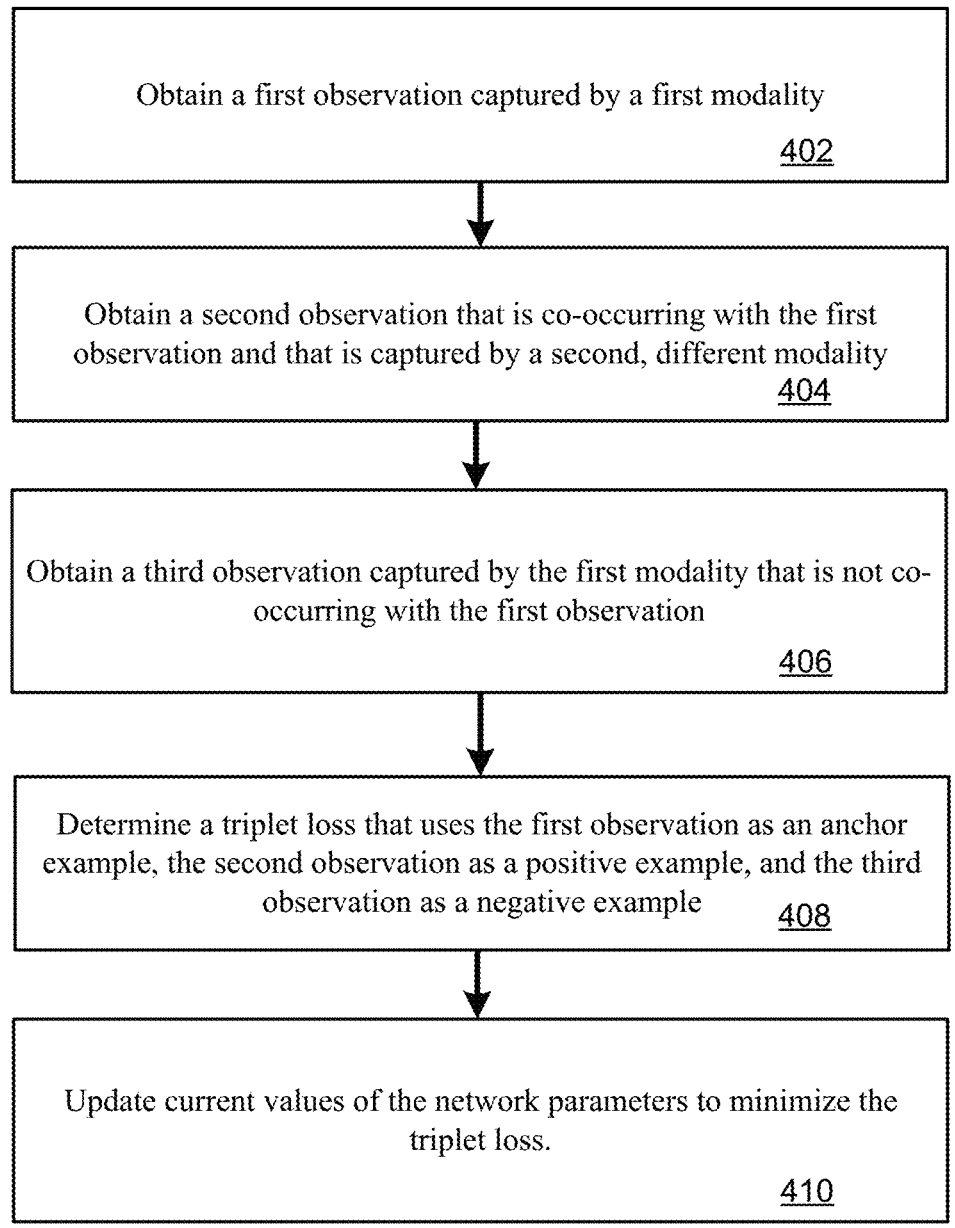
FIG. 4 is a flow diagram of an example process for training a time-contrastive neural network.

FIG. 4 is a flow diagram of an example process 400 for training a time-contrastive neural network using observations captured by multiple modalities. The neural network is configured to receive an input observation characterizing a state of an environment and to process the input observation to generate a numeric embedding of the state of the environment. For convenience, the process 400 will be described as being performed by a system of one or more computers located in one or more locations. For example, a machine learning system, e.g., the machine learning system 100 of FIG. 1, appropriately programmed in accordance with this specification, can perform the process 400.

The system can repeatedly perform the process 400 on different triples of observations to train the neural network.

The system obtains a first observation captured by a first modality (step 402). The first observation may be an image and the first modality may be a camera at a first viewpoint. The first observation is also referred to as an anchor observation.

The system obtains a second observation that is co-occurring with the first observation and that is captured by a second, different modality (step 404). The second observation may be an image and the second modality may be a camera at a second viewpoint.

The system obtains a third observation captured by the first modality that is not co-occurring with the first observation (step 406).

In some cases, the system may select the third observation randomly from the observations captured by the first modality that are within the temporal neighborhood of the first observation.

In some other cases, to select the third observation, the system may select an observation that is a hard negative or semi-hard negative relative to the anchor observation from a sequence of observations captured by the first modality that are within the temporal neighborhood of the anchor observation. In particular, to select an observation that is a hard negative, the system generates a current embedding for each observation in the sequence by running the sequence of observations through the time-contrastive neural network. The hard negative observation is the observation that has a current embedding that is farthest away from the embedding of the anchor observation. The semi-hard negative observations are the observation that are not too close, i.e., observations having current embeddings that are farther from the embedding of the anchor observation than a threshold distance.

The system determines a triplet loss that uses the first observation as an anchor example, the second observation as a positive example, and the third observation as a negative example (step 408).

In particular, the system processes the first observation using the neural network in accordance with the current values of the network parameters to generate a first embedding. The system processes the second observation using the neural network in accordance with the current values of the network parameters to generate a second embedding. The system processes the third observation using the neural network in accordance with the current values of the network parameters to generate a third embedding. The system determines the triplet loss from (i) a first distance between the first embedding and the second embedding and (ii) a second distance between the first embedding and the third embedding.

For example, the system can determine the triplet loss for a given triple of observation as follows:

$$\text{Triplet loss} = \|f(x_i^a) - f(x_i^p)\|_2^2 - \|f(x_i^a) - f(x_i^n)\|_2^2 + \alpha,$$

where $f(\ )$ is an embedding function that embeds an observation x into an embedding space (e.g., a d-dimensional Euclidean space). $x_i^a$ is the anchor observation 108, $x_i^p$ is the positive observation 110, and $x_i^n$ is the negative observation. N is the number of triples of observations in the training input data.

The system then updates values of the network parameters to minimize the triplet loss (step 410). The system can updates the values of the network parameters using conventional neural network training technique, e.g., a gradient descent-based training technique. For example, the system backpropagates the gradient of the triplet loss to determine a respective updated value for each of the network parameters of the neural network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a neural network having a plurality of network parameters, wherein the neural network is configured to receive an input observation characterizing a state of an environment and to process the input observation to generate a numeric embedding of the state of the environment, the method comprising:
   obtaining a first observation captured by a first modality;
   obtaining a second observation that is co-occurring with the first observation and that is captured by a second, different modality;
   obtaining a third observation captured by the first modality that is not co-occurring with the first observation;
   determining a gradient of a triplet loss that uses the first observation as an anchor example, the second observation as a positive example, and the third observation as a negative example; and
   updating current values of the network parameters using the gradient of the triplet loss,
   wherein the observations are images related to a same environment, wherein the first modality is a camera at a first viewpoint, and wherein the second modality is another camera at a second, different viewpoint.

2. The method of claim 1, wherein the third observation is captured within a predetermined time period of the first observation.

3. The method of claim 2, wherein obtaining the third observation comprises:
   selecting the third observation randomly from the observations captured by the first modality within the predetermined time period of the first observation.

4. The method of claim 2, wherein obtaining the third observation comprises:
   selecting an observation that is a hard negative relative to the first observation from the observations captured by the first modality within the predetermined time period of the first observation.

5. The method of claim 1, wherein determining the gradient of the triplet loss comprises:
   processing the first observation using the neural network in accordance with the current values of the network parameters to generate a first embedding;
   processing the second observation using the neural network in accordance with the current values of the network parameters to generate a second embedding;
   processing the third observation using the neural network in accordance with the current values of the network parameters to generate a third embedding; and
   determining the triplet loss from (i) a first distance between the first embedding and the second embedding and (ii) a second distance between the first embedding and the third embedding.

6. The method of claim 1, wherein the neural network is further configured to process the numeric embedding to generate a control output defining a control input to an agent interacting with the environment.

7. The method of claim 6, wherein training the neural network further comprises training the neural network to generate control outputs cause the agent to imitate another agent interacting with the environment.

8. The method of claim 6, wherein the first modality is the camera that captures a self-view of the agent interacting with the environment, and wherein training the neural network further comprises training the neural network to generate control outputs that position joints of the agent in a same position as in received captured self-views.

9. The method of claim 6, wherein the agent is a robotic agent.

10. The method of claim 1, wherein the environment includes an agent performing a specified task.

11. A system comprising one or more computers and one or more storage devices storing instructions that, when executed by the one or more computers, cause the one or more computers to perform operations for training a neural network having a plurality of network parameters, wherein the neural network is configured to receive an input observation characterizing a state of an environment and to process the input observation to generate a numeric embedding of the state of the environment, the operations comprising:
   obtaining a first observation captured by a first modality;
   obtaining a second observation that is co-occurring with the first observation and that is captured by a second, different modality;
   obtaining a third observation captured by the first modality that is not co-occurring with the first observation;
   determining a gradient of a triplet loss that uses the first observation as an anchor example, the second observation as a positive example, and the third observation as a negative example; and updating current values of the network parameters using the gradient of the triplet loss, wherein the observations are images related to a same environment, wherein the first modality is a camera at a first viewpoint, and wherein the second modality is another camera at a second, different viewpoint.

12. One or more non-transitory computer storage media storing instructions that, when executed by one or more computers, cause the one or more computers to perform operations for training a neural network having a plurality of network parameters, wherein the neural network is configured to receive an input observation characterizing a state of an environment and to process the input observation to generate a numeric embedding of the state of the environment, the operations comprising:

obtaining a first observation captured by a first modality;

obtaining a second observation that is co-occurring with the first observation and that is captured by a second, different modality;

obtaining a third observation captured by the first modality that is not co-occurring with the first observation;

determining a gradient of a triplet loss that uses the first observation as an anchor example, the second observation as a positive example, and the third observation as a negative example; and updating current values of the network parameters using the gradient of the triplet loss, wherein the observations are images related to a same environment, wherein the first modality is a camera at a first viewpoint, and wherein the second modality is another camera at a second, different viewpoint.

13. The one or more non-transitory computer storage media of claim 12, wherein the third observation is captured within a predetermined time period of the first observation.

14. The one or more non-transitory computer storage media of claim 13, wherein obtaining the third observation comprises:

selecting the third observation randomly from the observations captured by the first modality within the predetermined time period of the first observation.

15. The one or more non-transitory computer storage media of claim 13, wherein obtaining the third observation comprises:

selecting an observation that is a hard negative relative to the first observation from the observations captured by the first modality that are within the predetermined time period of the first observation.

16. The one or more non-transitory computer storage media of claim 12, wherein determining the gradient of the triplet loss comprises:

processing the first observation using the neural network in accordance with the current values of the network parameters to generate a first embedding;

processing the second observation using the neural network in accordance with the current values of the network parameters to generate a second embedding;

processing the third observation using the neural network in accordance with the current values of the network parameters to generate a third embedding; and determining the triplet loss from (i) a first distance between the first embedding and the second embedding and (ii) a second distance between the first embedding and the third embedding.

17. The one or more non-transitory computer storage media of claim 12, wherein the neural network is further configured to process the numeric embedding to generate a control output defining a control input to an agent interacting with the environment.

18. The one or more non-transitory computer storage media of claim 17, wherein training the neural network further comprises training the neural network to generate control outputs that cause the agent to imitate another agent interacting with the environment.

* * * * *